(12) United States Patent
Ding et al.

(10) Patent No.: US 12,037,771 B2
(45) Date of Patent: Jul. 16, 2024

(54) DISPLAY CONTROL SYSTEM, DISPLAY CONTROL METHOD, AND REMOTE OPERATION SYSTEM

(71) Applicant: Komatsu Ltd., Tokyo (JP)

(72) Inventors: Qi Ding, Tokyo (JP); Yasuhiro Ibusuki, Tokyo (JP); Jun Morinaga, Tokyo (JP); Masanori Minagawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 440 days.

(21) Appl. No.: 17/266,205

(22) PCT Filed: Oct. 30, 2019

(86) PCT No.: PCT/JP2019/042597
§ 371 (c)(1),
(2) Date: Feb. 5, 2021

(87) PCT Pub. No.: WO2020/090898
PCT Pub. Date: May 7, 2020

(65) Prior Publication Data
US 2021/0230836 A1 Jul. 29, 2021

(30) Foreign Application Priority Data
Oct. 31, 2018 (JP) .................. 2018-205854

(51) Int. Cl.
*G06T 7/00* (2017.01)
*E02F 9/20* (2006.01)
(Continued)

(52) U.S. Cl.
CPC ........... *E02F 9/205* (2013.01); *G05D 1/0038* (2013.01); *G05D 1/0891* (2013.01); *G06T 7/70* (2017.01); *G06T 2207/30252* (2013.01)

(58) Field of Classification Search
CPC .. E02F 9/205; G06T 7/70; G06T 2207/30252; G05D 1/0038; G05D 1/0891; G05D 2201/0202
(Continued)

(56) References Cited

U.S. PATENT DOCUMENTS

2017/0308074 A1 10/2017 Kandula et al.
2017/0322624 A1 11/2017 Niccolini et al.
(Continued)

FOREIGN PATENT DOCUMENTS

JP H0596985 4/1993
JP 2001348914 12/2001
(Continued)

OTHER PUBLICATIONS

Wall Street Journal, "The Secret Technology Helping Driverless Cars: Remote Control," Jul. 9, 2018, YouTube, https://www.youtube.com/watch?v=9sgetWQGYxY, whole video. (Year: 2018).*

*Primary Examiner* — Tiffany P Young
(74) *Attorney, Agent, or Firm* — Fish & Richardson P.C.

(57) ABSTRACT

A captured image acquisition unit configured to acquire a captured image captured by an imaging device mounted on a work vehicle. A posture image acquisition unit configured to acquire a posture image representing at least one of a roll angle and a pitch angle of the work vehicle. A display image generation unit configured to generate a display image in which the posture image is disposed on the captured image so as to display the posture image at a position facing the operator's seat in a width direction of the display device. A display control unit configured to output a display signal for displaying a display image to the display device.

16 Claims, 8 Drawing Sheets

(51) Int. Cl.
*G05D 1/00* (2006.01)
*G06T 7/70* (2017.01)

(58) Field of Classification Search
USPC .......................................................... 701/50
See application file for complete search history.

(56) References Cited

U.S. PATENT DOCUMENTS

| | | |
|---|---|---|
| 2018/0051446 A1 | 2/2018 | Yoshinada et al. |
| 2018/0094408 A1 | 4/2018 | Shintani et al. |
| 2020/0023772 A1* | 1/2020 | Kurnaz .................... B60R 1/00 |

FOREIGN PATENT DOCUMENTS

| | | |
|---|---|---|
| JP | 2012-001041 A | 1/2012 |
| JP | 2016-111509 A | 6/2016 |
| WO | WO2017047826 | 3/2017 |
| WO | WO2017069683 | 4/2017 |

* cited by examiner

DISPLAY CONTROL SYSTEM, DISPLAY CONTROL METHOD, AND REMOTE OPERATION SYSTEM

CROSS-REFERENCE TO RELATED APPLICATIONS

This application is a National Stage application under 35 U.S.C. § 371 of International Application No. PCT/JP2019/042597, filed on Oct. 30, 2019, which claims priority to Japanese Patent Application No. 2018-205854, filed on Oct. 31, 2018. The contents of the prior applications are incorporated herein in their entirety.

TECHNICAL FIELD

The present invention relates to a display control system, a display control method, and a remote operation system for a display device in a remote operation device for performing remote operation of a work vehicle.

BACKGROUND ART

The technology for remotely operating a work vehicle is known. In order to remotely operate the work vehicle, it is necessary to be able to recognize the surrounding situation of the work vehicle from the outside. Accordingly, the remotely operated work vehicle is provided with an imaging device for imaging the surrounding situation and a communication apparatus for transmitting the captured image to the outside. Thus, the operator can perform the operation while visually checking the image transmitted from the work vehicle. Patent Document 1 discloses a technique of displaying a level on a display device to allow an operator to recognize the inclination of a work machine.

CITATION LIST

Patent Literature

Patent Document 1 WO 2017/047826

SUMMARY OF INVENTION

Technical Problem

However, in the display of the level described in Patent Literature 1, there is a possibility that the operator cannot intuitively recognize the inclination of the work vehicle. For example, in a case where the screen of the display device provided near the operator's seat is oriented obliquely or laterally with respect to the front of the operator's seat, when the operator visually recognizes the level displayed on the display device, the corresponding level has a behavior differently from a physical level; therefore, there is a possibility that the operator cannot intuitively recognize the inclination of the work vehicle. In particular, in the remote operation, since the operator performs the operation while viewing the captured image, the operator cannot feel the inclination of the work vehicle, and it is difficult to recognize the inclination of the work vehicle.

An aspect of the present invention has an object to provide a display control system, a display control method, and a remote operation system that enable an operator to intuitively recognize an inclination of a work vehicle.

Solution to Problem

According to an aspect of the present invention, a display control system of a display device facing an operator's seat of a remote operation device for performing remote operation of a work vehicle includes a captured image acquisition unit configured to acquire a captured image captured by an imaging device mounted on the work vehicle; a posture image acquisition unit configured to acquire a posture image representing at least one of a roll angle and a pitch angle of the work vehicle; a display image generation unit configured to generate a display image in which the posture image is disposed on the captured image so as to display the posture image at a position facing the operator's seat of the display device; and a display control unit configured to output a display signal for displaying the display image to the display device.

Advantageous Effects of Invention

According to the above aspect, the display control system enables the operator to intuitively recognize the inclination of the work vehicle.

DESCRIPTION OF EMBODIMENTS

First Embodiment

<<Remote Operation System>>

Figure 1:
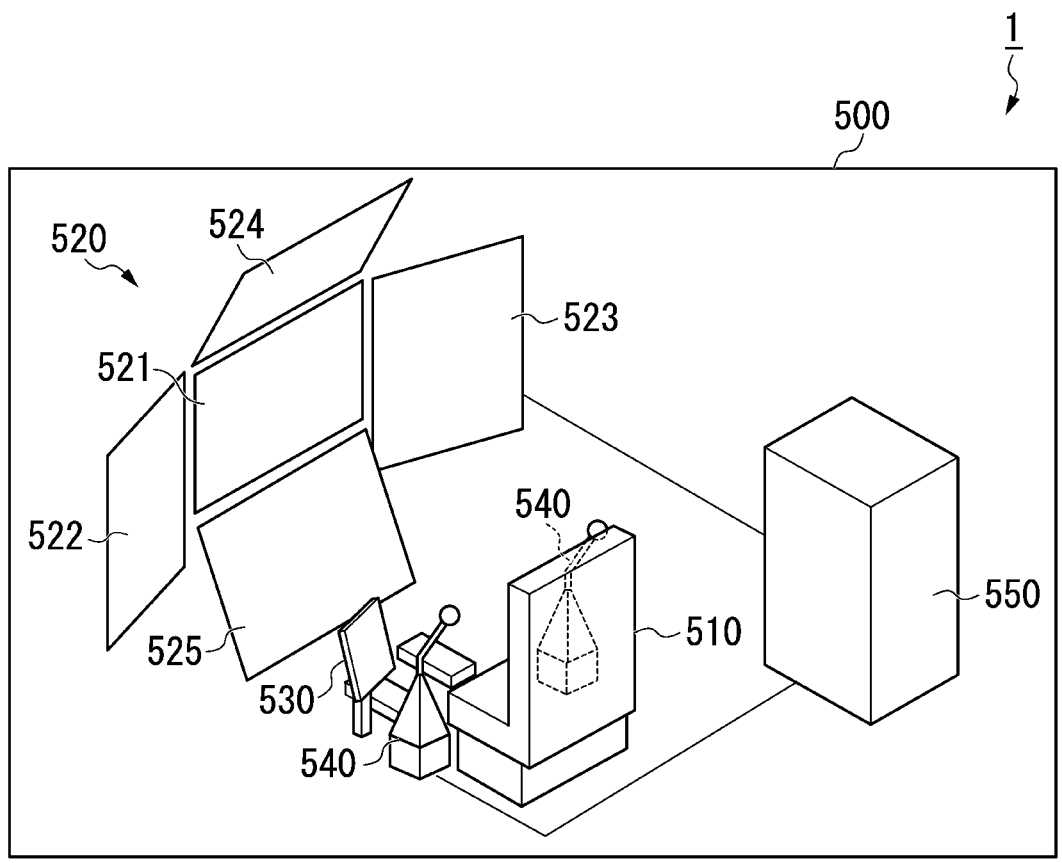
FIG. 1 is a schematic diagram showing a configuration of a remote operation system according to a first embodiment.
Figure 1:
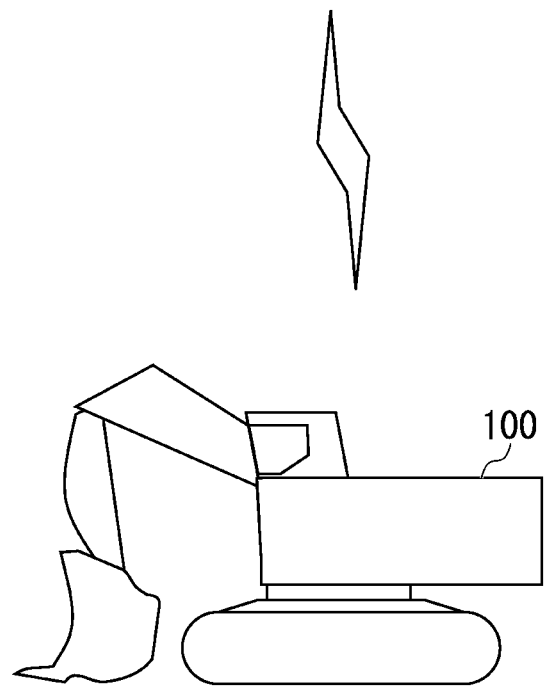

FIG. 1 is a schematic diagram showing a configuration of a remote operation system according to a first embodiment.

A remote operation system 1 includes a work vehicle 100 operated by remote operation and a remote operation room 500 to perform remote operation. The work vehicle 100 is provided at a work site (for example, a mine or a quarry). The remote operation room 500 is provided at a point separated from the work vehicle 100 (for example, a city and an inside of the work site). The work vehicle 100 and remote operation room 500 are connected via a network such as the Internet.

The remote operation system 1 is a system to operate the work vehicle 100 by using the remote operation room 500.

The work vehicle 100 operates according to an operation signal received from the remote operation room 500.

The remote operation room 500 receives the operation of the work vehicle 100 by the operation of the operator and transmits the operation signal to the work vehicle 100. The remote operation room 500 is an example of a remote operation device.

<<Work Vehicle>>

Figure 2:
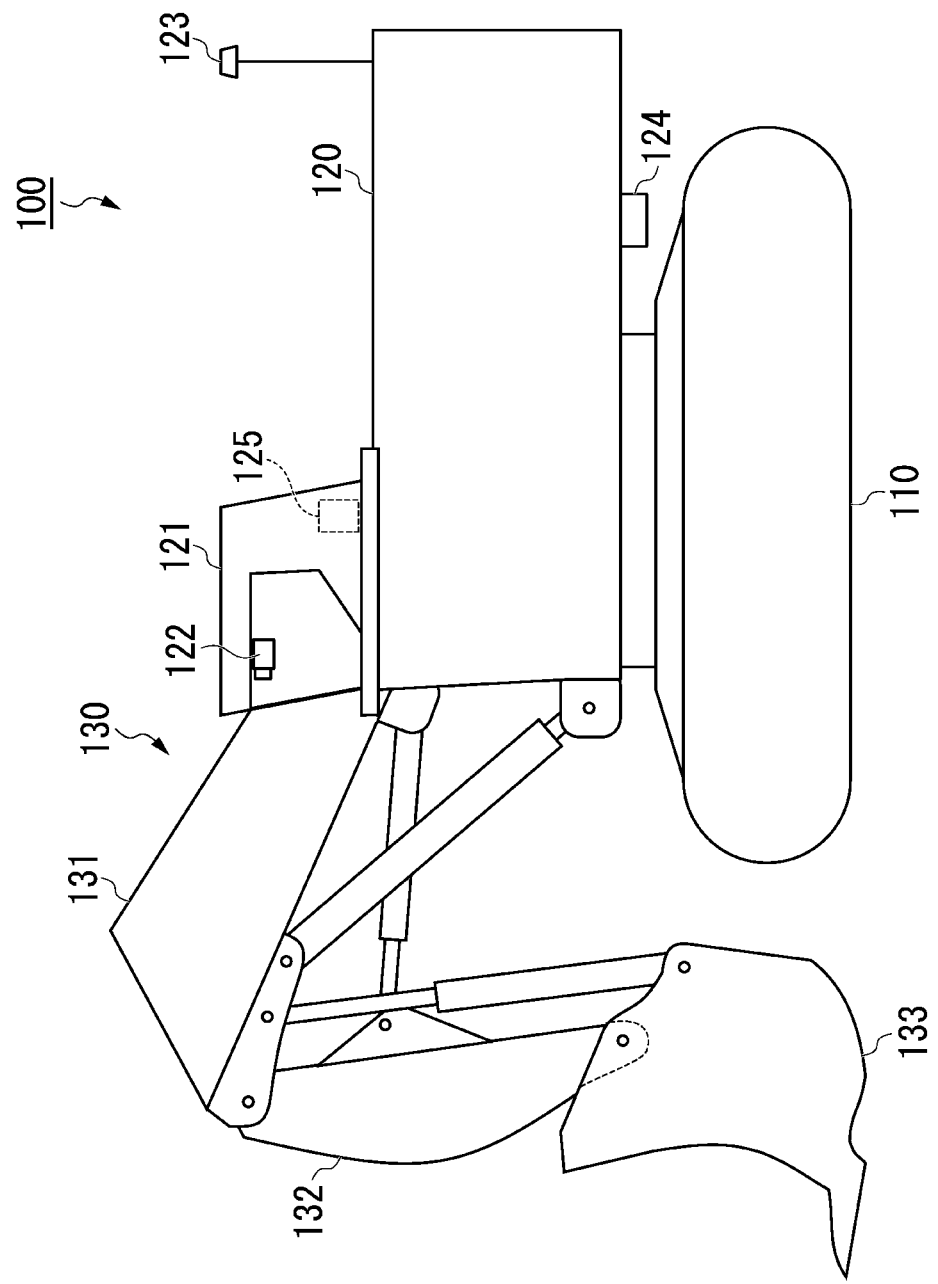
FIG. 2 is an external diagram of a work vehicle according to the first embodiment.

FIG. 2 is an external diagram of the work vehicle according to the first embodiment.

The work vehicle 100 according to the first embodiment is a hydraulic excavator. The work vehicle 100 according to another embodiment may be a work vehicle other than the hydraulic excavator, such as a wheel loader or a bulldozer.

The work vehicle 100 includes work equipment 130 driven by hydraulic pressure, a swing body 120 that supports the work equipment 130, and an undercarriage 110 that supports the swing body 120.

The work equipment 130 includes a boom 131, an arm 132, and a bucket 133. A base end portion of the boom 131 is attached to the swing body 120 via a pin.

The arm 132 connects the boom 131 to the bucket 133. A base end portion of the arm 132 is attached to a tip portion of the boom 131 via a pin.

The bucket 133 includes teeth for excavating earth or the like and a container for containing the excavated earth. A base end portion of the bucket 133 is attached to a tip portion of the arm 132 via a pin.

The swing body 120 includes a cab 121. The cab 121 is provided on the left side of the work equipment 130. The cab 121 is provided with a front camera 122. The front camera 122 is installed at a front upper portion in the cab 121. The front camera 122 images the front of the cab 121 through a windshield at a front portion of the cab 121. Herein, the "front" refers to a direction in which the work equipment 130 is mounted on the swing body 120, and the "rear" refers to a direction opposite to the "front". The "lateral" refers to a direction (right-and-left direction) intersecting the front-and-rear direction. An example of the front camera 122 includes an imaging device using a charge coupled device (CCD) sensor and a complementary metal oxide semiconductor (CMOS) sensor.

Figure 3:
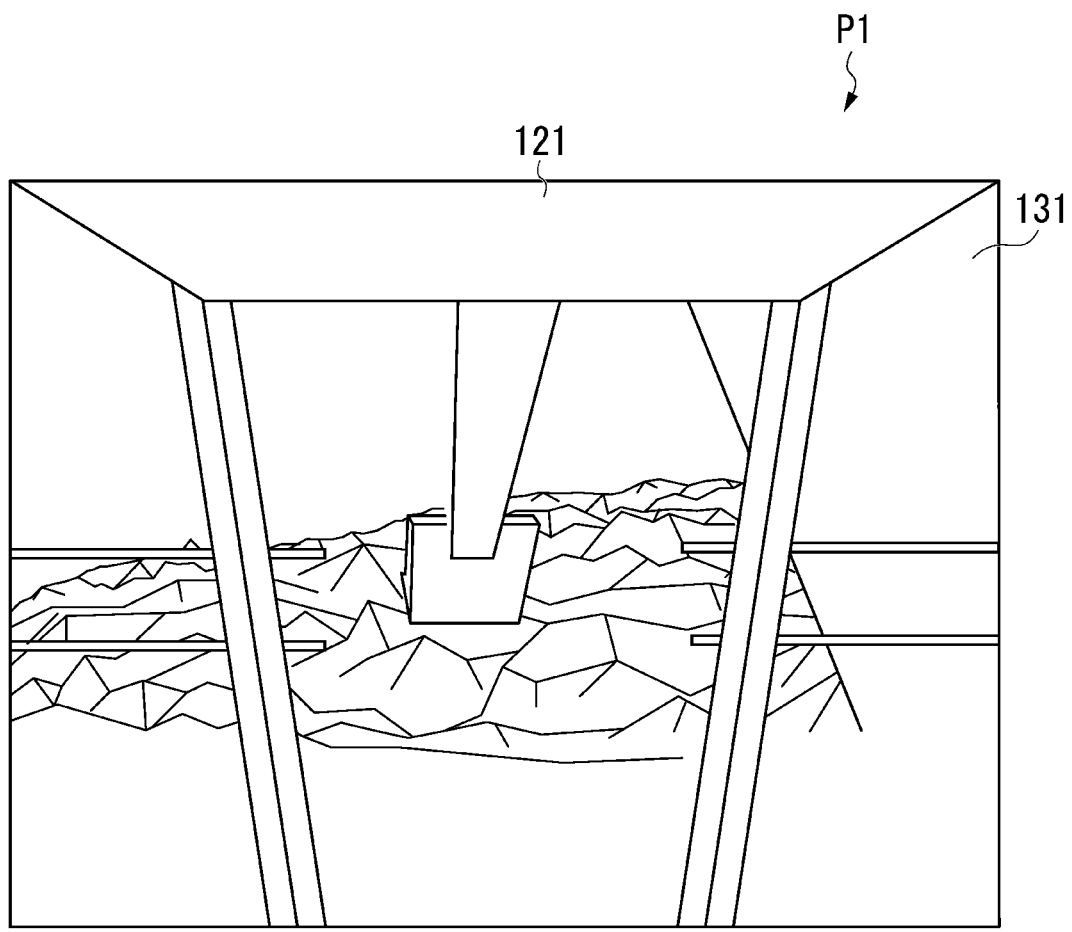
FIG. 3 is an example of an image captured by an imaging device of the work vehicle according to the first embodiment.

FIG. 3 is an example of an image captured by the imaging device of the work vehicle according to the first embodiment. The front camera 122 images a scope in which a work target in front of the work equipment 130 and the cab 121 is shown. That is, as shown in FIG. 3, an image P1 captured by the front camera 122 shows that the work target in front of the work equipment 130 and the cab 121 is shown. Further, since the cab 121 is provided on the left side of the work equipment 130, a portion of the boom 131 is shown in the right side portion of the image P1. Further, a ceiling portion of the cab 121 is shown in an upper portion of the image P1.

The work vehicle 100 includes a front camera 122, a position and azimuth direction calculator 123, an inclination measurer 124, and a control device 125.

The position and azimuth direction calculator 123 calculates the position of the swing body 120 and an azimuth direction of the swing body 120. The position and azimuth direction calculator 123 includes two receivers that receive positioning signals from artificial satellites constituting the GNSS. The two receivers are installed at positions different from each other on the swing body 120. The position and azimuth direction calculator 123 measures a position of a representative point of the swing body 120 in a site coordinate system (the origin of an excavator coordinate system) based on the positioning signal received by the receiver.

The position and azimuth direction calculator 123 uses respective positioning signals received by the two receivers to calculate an azimuth direction in which the swing body 120 faces as a relationship between an installation position of one receiver and an installation position of the other receiver.

In another embodiment, the position and azimuth direction calculator 123 may measure an azimuth direction in which the swing body 120 faces based on a measurement value of a rotary encoder or an IMU.

The inclination measurer 124 measures an acceleration and angular speed of the swing body 120, and measures a posture (for example, a roll angle, a pitch angle, and a yaw angle) of the swing body 120 based on the measurement result. The inclination measurer 124 is installed, for example, on a lower surface of the swing body 120. The inclination measurer 124 can use, for example, an inertial measurement unit (IMU). The inclination measurer 124 may be an inclinometer that measures an inclination angle regardless of acceleration and angular speed. Further, the work vehicle 100 according to another embodiment may not be provided with the inclination measurer 124.

The control device 125 transmits the image captured by the front camera 122 and the swing speed, position, azimuth direction, and inclination angle of the swing body 120 to the remote operation room 500. Hereinafter, information measured by various sensors included in the work vehicle 100 and transmitted by the control device 125 is also referred to as vehicle body information. The control device 125 receives an operation signal from the remote operation room 500. The control device 125 drives the work equipment 130, the swing body 120, or the undercarriage 110 based on the received operation signal.

<<Remote Operation Room>>

The remote operation room 500 includes an operator's seat 510, a first display device 520, a second display device 530, an operation device 540, and a control device 550.

The first display device 520 is disposed so as to face the operator's seat 510. Being disposed so as to face the operator's seat 510 is equivalent to being disposed so as to face the operator. The first display device 520 is positioned in front of the operator's eyes when the operator sits in the operator's seat 510. As shown in FIG. 1, the first display device 520 is constituted with a central display 521, a left display 522, a right display 523, an upper display 524, and a lower display 525 that are arranged. The left display 522 is provided on the left side of the central display 521. The right display 523 is provided on the right side of the central display 521. The upper display 524 is provided above the central display 521. The lower display 525 is provided below the central display 521. That is, the central display 521, the upper display 524, and the lower display 525 of the first display device 520 are disposed directly in front of the operator's seat 510. The central display 521, the upper display 524, and the lower display 525 display a work object and the bucket 133 of the work equipment 130.

In another embodiment, the number of displays constituting the first display device 520 is not limited thereto. For example, the first display device 520 may be constituted with one display. Further, the first display device 520 may be such that an image on a curved surface or a spherical surface is projected with a projector or the like.

The second display device 530 is disposed diagonally in front of the operator's seat 510 such that the screen thereof faces the operator's seat 510. The second display device 530 displays vehicle body information (a remaining fuel amount and an engine water temperature) transmitted from the work vehicle 100, a notification of an abnormality in the work vehicle 100, or the like. In another embodiment, the position of the second display device 530 does not have to be diagonally in front of the operator's seat 510 as long as being able to be visually recognized by the operator. Further, the remote operation room 500 according to another embodiment may not include the second display device 530.

The operation device 540 is disposed in the vicinity of the operator's seat 510. The operation device 540 is positioned within a scope where the operator can operate when the operator sits in the operator's seat 510. The operation device 540 includes, for example, an electric lever and an electric pedal. The operator operates the electric lever and the electric pedal, so that the operation device 540 outputs the operation signals of the boom 131, the arm 132, and the bucket 133, the swing operation signal of the swing body 120, and the travel operation signal of the undercarriage 110. The operation device 540 includes, for example, two levers. The two levers are provided on both sides of the operator's seat 510. Since the positions of the two levers affect the operator's getting on and off the operator's seat 510, the two levers are provided at an interval at least equal to the width of the operator's seat or wider than the width of the operator's seat 510, such as the positions of the right and left arm rests of the operator's seat 510. In addition, the two levers are provided at an interval narrower than the width of the opposing first display device 520.

The control device 550 causes the first display device 520 to display the image and the vehicle body information received from the work vehicle 100. That is, the control device 550 is an example of a display control system. Further, the control device 550 transmits the operation signal input to the operation device 540, to the work vehicle 100. In addition, the display control system may be a remote operation room 500 including the control device 550, or may further include the control device 125 and the front camera 122 of the work vehicle 100.

<<Control Device of Remote Operation Room>>

Figure 4:
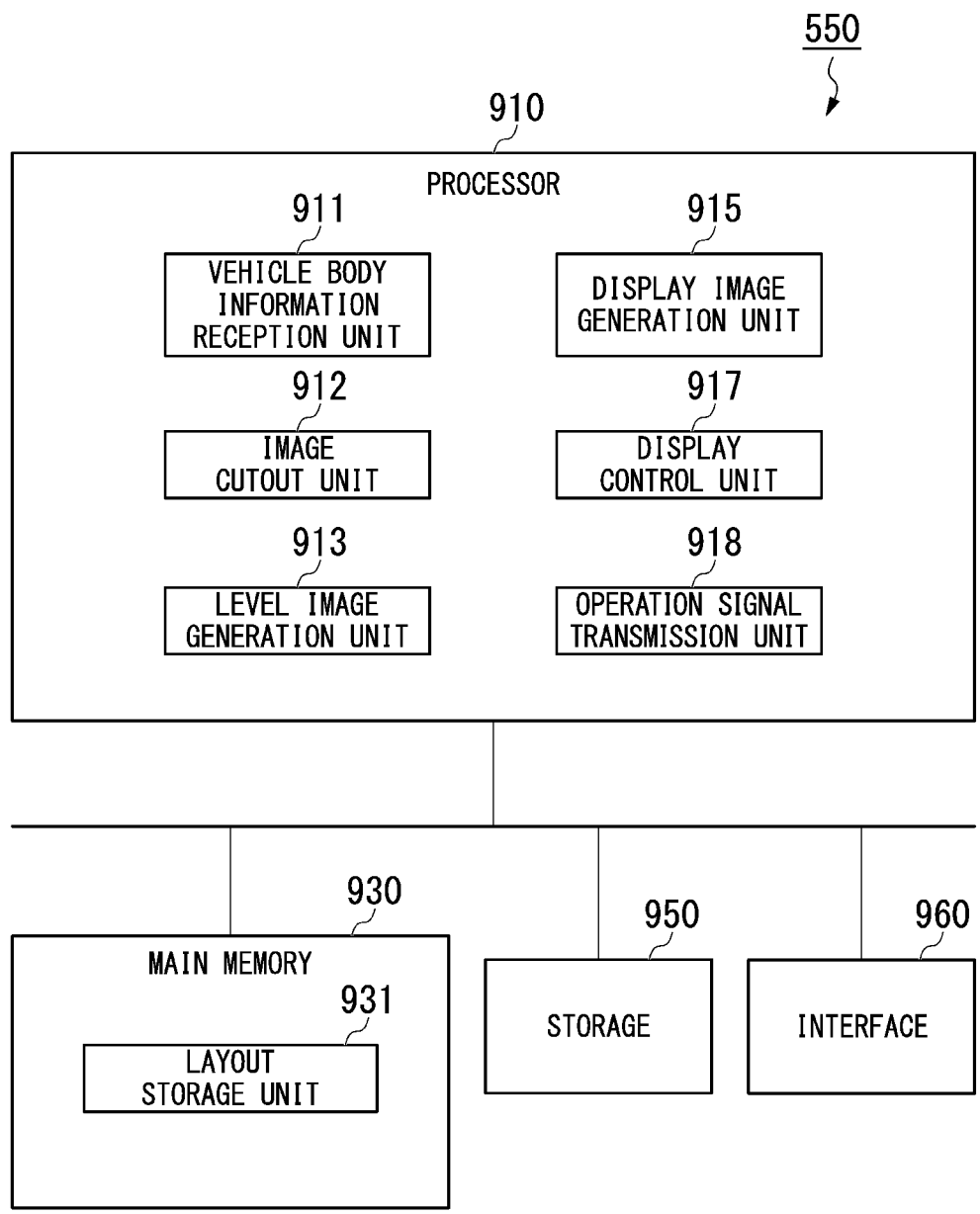
FIG. 4 is a schematic block diagram showing a configuration of a control device of a remote operation room according to the first embodiment.

FIG. 4 is a schematic block diagram showing a configuration of the control device of the remote operation room according to the first embodiment.

The control device 550 is a computer including a processor 910, a main memory 930, a storage 950, and an interface 970. The storage 950 stores a program. The processor 910 reads the program from the storage 950 to develop the program in the main memory 930 and executes processing in accordance with the program.

Examples of the storage 950 include a hard disk drive (HDD), a solid state drive (SSD), a magnetic disk, a magneto-optical disk, Compact Disc Read Only Memory (CD-ROM), Digital Versatile Disc Read Only Memory (DVD-ROM), a semiconductor memory, or the like. The storage 950 may be an internal medium directly connected to a common communication line of the control device 550, or may be an external medium connected to the control device 550 via the interface 970. The storage 950 is a non-transitory tangible storage medium. In another embodiment, the control device 550 may include a custom large scale integrated circuit (LSI) such as a programmable logic device (PLD), or a semi-custom LSI such an application specific integrated circuit (ASIC) in addition to or in place of the above configuration. Examples of the PLD include a programmable array logic (PAL), a generic array logic (GAL), a complex programmable logic device (CPLD), and a field programmable gate array (FPGA). In this case, some or all of the functions realized by the processor 910 may be realized by the integrated circuit.

The processor 910 includes a vehicle body information reception unit 911, an image cutout unit 912, a level image generation unit 913, a display image generation unit 914, a display control unit 915, and an operation signal transmission unit 916, by executing a program.

The vehicle body information reception unit 911 receives the images captured by the front camera 122, the swing speed, position, azimuth direction, and inclination angle of the swing body 120, from the work vehicle 100. That is, the vehicle body information reception unit 911 is an example of a captured image acquisition unit.

Figure 5:
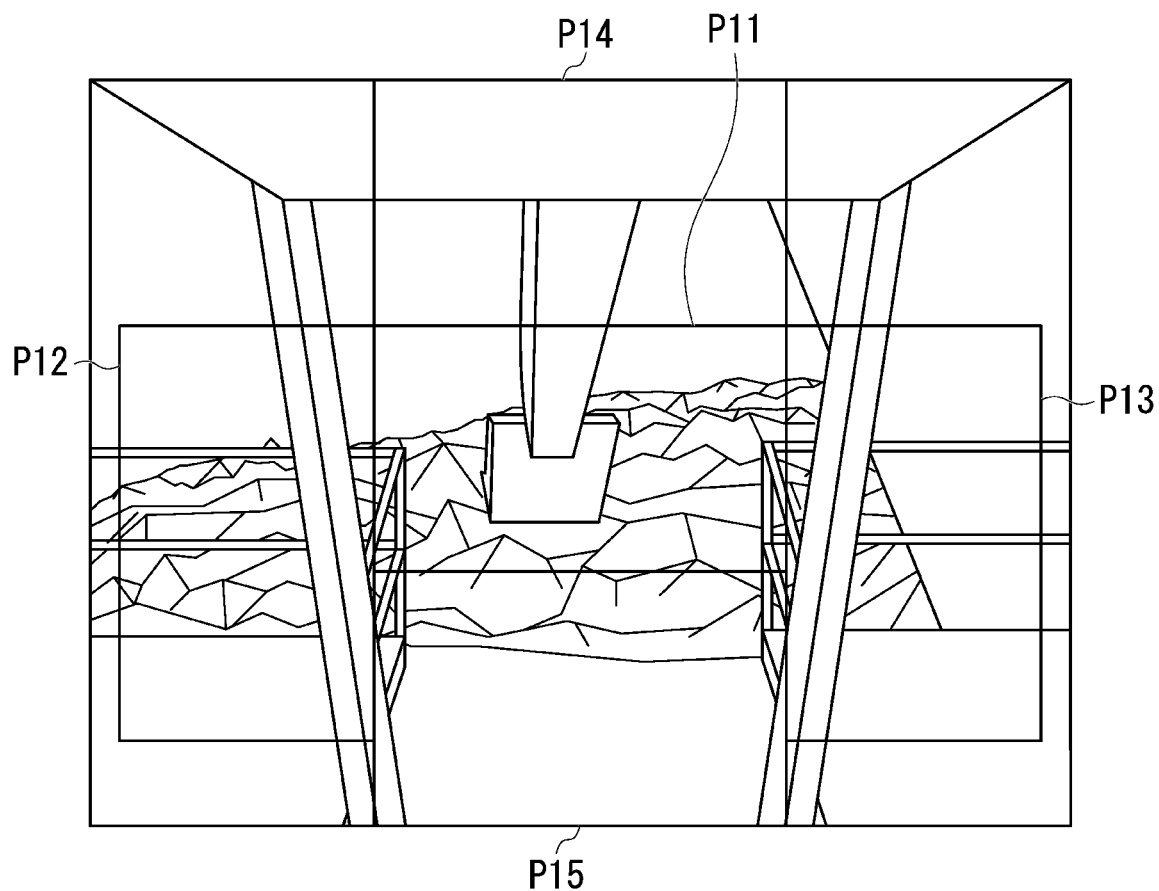
FIG. 5 is a diagram showing an example of an image cut out from an image captured by a front camera.

FIG. 5 is a diagram showing an example of an image cut out from the image captured by the front camera.

The image cutout unit 912 cuts out each of a central image P11 for displaying on the central display 521, a left image P12 for displaying on the left display 522, a right image P13 for displaying on the right display 523, an upper image P14 for displaying on the upper display 524, and a lower image P15 for displaying on the lower display 525, from the image P1 received by the vehicle body information reception unit 911 and captured by the front camera 122. As shown in FIG. 4, the boom 131 is shown in a large part of the right image P13. Further, a ceiling portion of the cab 121 is shown in an upper portion of the image P14. Although the position where boom 131 is shown may vary depending on the posture of the work equipment 130, the boom 131 is shown in the right image P13 due to the arrangement of front camera 122 and the structure of the work vehicle 100. Hereinafter, the area in which a portion of the work vehicle 100 is shown in the image is also referred to as "an area in which a portion of the work vehicle 100 can be shown". That is, the "area in which a portion of the work vehicle 100 can be shown" is not limited to the area in which a portion of the work vehicle 100 is always shown regardless of the posture of the work vehicle 100. When the first display device 520 is constituted with one display, the image cutout unit 912 may not perform cutting-out of the image.

Figure 6:
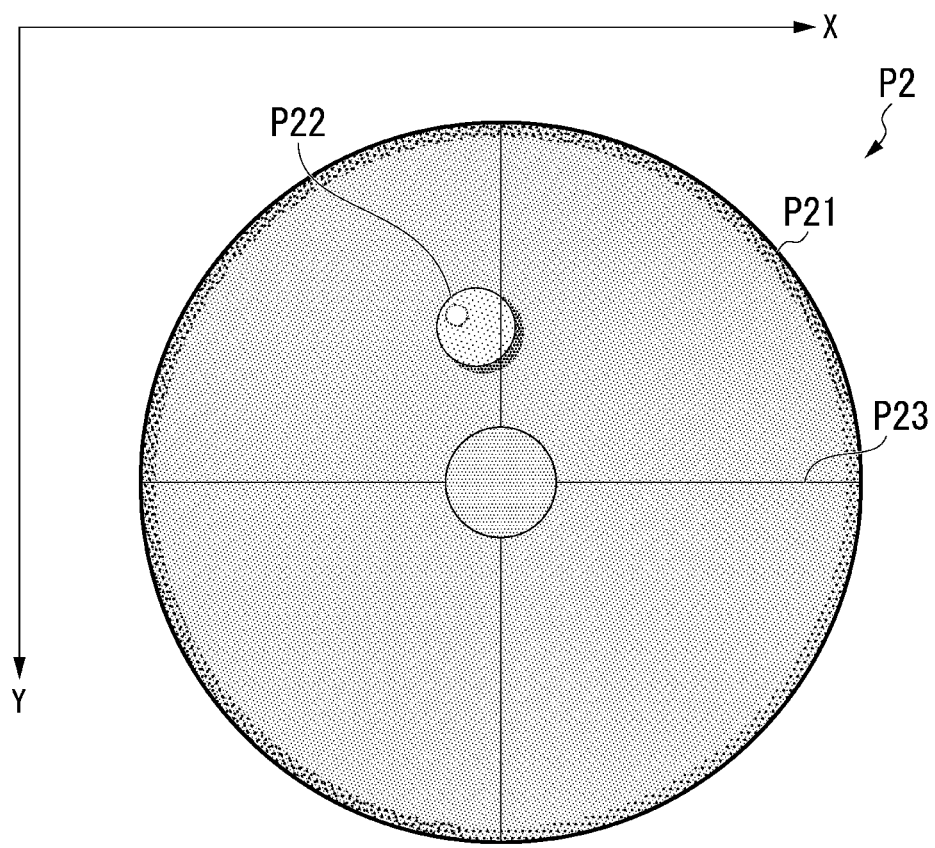
FIG. 6 is a diagram showing an example of a level image.

FIG. 6 is a diagram showing an example of a level image.

The level image generation unit 913 generates a level image P2 representing a level representing a roll angle and a pitch angle of the work vehicle 100 based on the inclination angle of the swing body 120 received by the vehicle body information reception unit 911. The pixels of the level image P2 are defined by coordinates represented by an X axis and a Y axis orthogonal to each other. In FIG. 6, the rightward direction is the +X direction, the leftward direction is the −X direction, the upward direction is the −Y direction, and the downward direction is the +Y direction. The level image P2 is an example of a posture image representing the posture of the work vehicle 100.

The level image P2 shown in FIG. 6 is a display mode when a bubble level is viewed from above. The level image P2 includes a housing image P21, a bubble image P22, and a marked-line image P23. The housing image P21 is an image simulating the housing of the bubble level. The bubble image P22 is an image simulating a bubble of the bubble level. The bubble image P22 is drawn inside the housing image P21. A center position of the bubble image P22 represents the direction and magnitude of the inclination of the swing body 120. That is, when the bubble image P22 is located at the center of the housing image P21, both the pitch angle and the roll angle of the swing body 120 are zero. When the bubble image P22 is positioned in the +X direction from the center of the housing image P21, the level image P2 indicates that the swing body 120 is inclined to the right (the roll angle is a negative value in the right hand system). When the bubble image P22 is positioned in the −X direction from the center of the housing image P21, the level image P2 indicates that the swing body 120 is inclined to the left (the roll angle is a positive value in a right-handed system). When the bubble image P22 is positioned in the +Y direction from the center of the housing image P21, the level image P2 indicates that the swing body 120 is inclined forward (the pitch angle is a negative value in the right-handed system). When the bubble image P22 is positioned in the −Y direction from the center of the housing image P21, the level image P2 indicates that the swing body 120 is inclined backward (the pitch angle is a positive value in the right-handed system). The bubble image P22 is an example of an aiming image.

The marked-line image P23 indicates the center of the X axis and the Y axis and the housing image P21.

Figure 7:
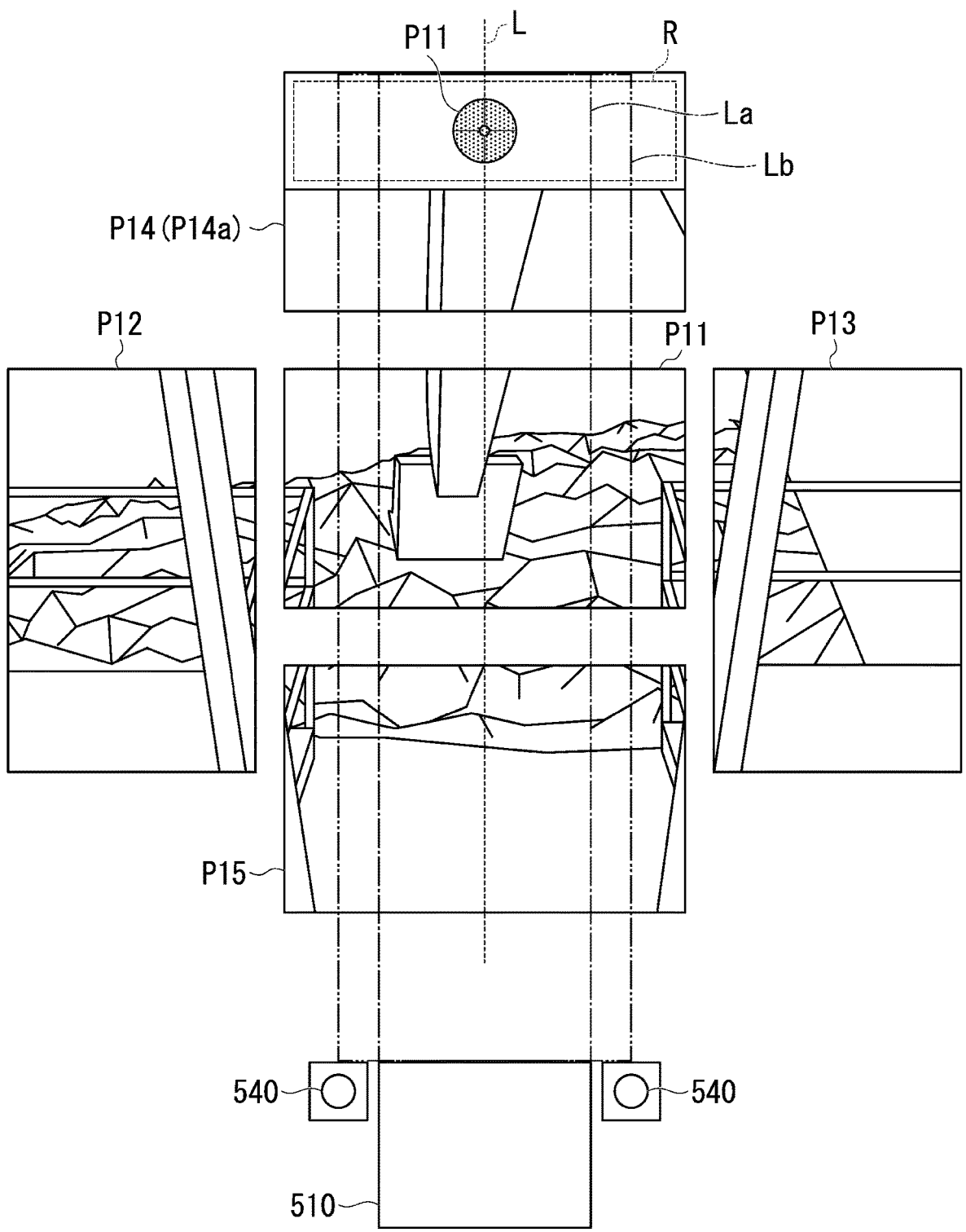
FIG. 7 is a diagram showing an example of a display image displayed on the display device according to the first embodiment.

FIG. 7 is a diagram showing an example of a display image displayed on a display device according to the first embodiment.

The display image generation unit 914 generates the display upper image P14a by disposing the level image P2 on the upper image P14 cut out by the image cutout unit 912. At this time, the display image generation unit 914 disposes the level image P2 at a position within an arrangement region R in which the ceiling portion of the cab 121 is shown in the upper image P14 and on a vertical line L facing the operator's seat 510 in a width direction when displayed on the upper display 524. The level image P2 is disposed so that the horizontal direction of the display is parallel to the X axis of the marked-line image P23 when displayed on the upper display 524. In addition, the level image P2 is preferably displayed on the upper display 524 so that the operator can operate without significantly moving the line of sight while viewing the captured image. In another embodiment, in addition to the level image P2, another image representing payload information or the like may be displayed on the upper display 524.

The display control unit 915 causes the central display 521 to display the central image P11. The left image P12 is displayed on the left display 522. The control device 550 causes the right display 523 to display the right image P13. The control device 550 causes the upper display 524 to display the display upper image P14a. The control device 550 causes the lower display 525 to display the lower image P15.

The operation signal transmission unit 916 generates an operation signal based on the operation of the operation device 540 by the operator, and transmits the operation signal to the work vehicle 100.

<<Display Control Method of Remote Operation Room>>

Figure 8:
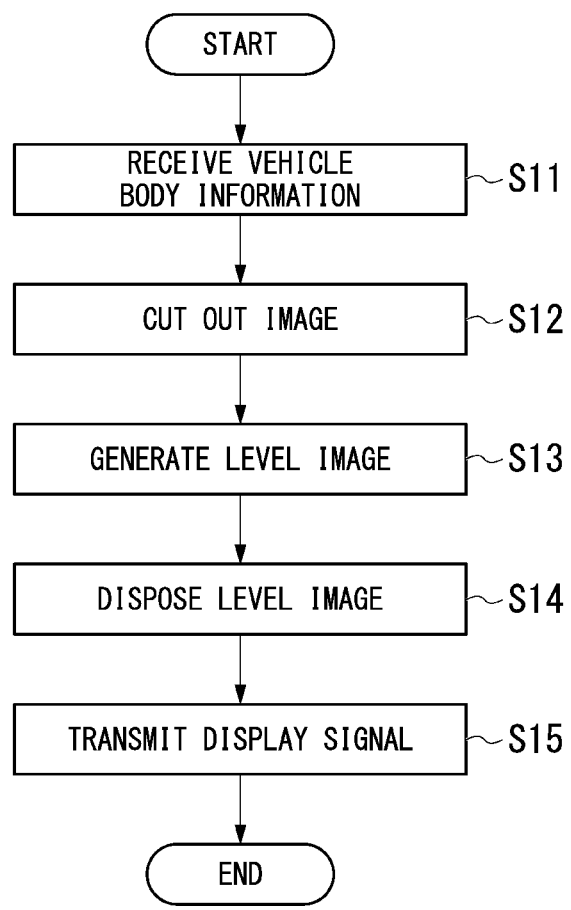
FIG. 8 is a flowchart showing a display control method by the control device for the remote operation room according to the first embodiment.

FIG. 8 is a flowchart showing a display control method by the control device of the remote operation room according to the first embodiment. When the remote operation of the work vehicle 100 is started, the control device 550 executes the display control shown below at a predetermined cycle.

The vehicle body information reception unit 911 receives vehicle body information from the control device 125 of the work vehicle 100 (step S11). Next, the image cutout unit 912 cuts out the central image P11, the left image P12, the right image P13, the upper image P14, and the lower image P15 from the image P1 captured by the front camera 122 in the received vehicle body information (step S12).

The level image generation unit 913 generates a level image P2 indicating the inclination of the swing body 120 based on the inclination angle of the swing body 120 in the received vehicle body information (step S13). The display image generation unit 914 generates the display upper image P14a by disposing the level image P2 at a position within the arrangement region R of the upper image P13 and on the vertical line L facing the operator's seat 510 (step S14). The display control unit 915 generates a display signal for causing the first display device 520 to display the center image P11, the left image P12, the right image P13, the display upper image P14a, and the lower image P15, and transmits the display signal to the first display device 520 (step S15).

<<Operation and Effects>>

In this manner, the control device 550 of the remote operation room 500 according to the first embodiment disposes the level image P2 on the upper image P14 so that the level image P2 is displayed at a position on the vertical line L facing the operator's seat 510 in the width direction of the first display device 520. That is, the operator's seat 510 and the first display device 520 are provided to face each other. The operator sits on the operator's seat 510 to directly face the central display 521. Therefore, the operator can visually recognize the level image P2 displayed on the upper display 524 without turning the operator's face to the left and right directions. Accordingly, since the left and right directions of the captured image P1 and the left and right directions of the level image P2 coincide with each other, the level image P2 displayed on the upper display 524 behaves consistently with the captured image P1. Therefore, the operator can intuitively recognize the inclination of the work vehicle 100. The level image P2 may be displayed on the left display 522 or the right display 523, but in order to allow the operator to intuitively recognize the inclination of the work vehicle 100, the level image P2 is preferably displayed on the central display 521 facing the operator, the upper display 524, or the lower display 525.

When the level image P2 is displayed on, for example, the second display device 530, the second display device 530 is disposed diagonally in front of the operator's seat so that the screen faces the operator's seat. Therefore, the left and right directions of the captured image P1 displayed on the central display 521 do not coincide with the left and right directions of the level image P2 displayed on the second display device 530. In this case, it is difficult for the operator to intuitively recognize the inclination of the work vehicle 100.

In addition, the control device 550 according to the first embodiment disposes the level image in the arrangement region R in which the work vehicle 100 is shown in the captured image P1. Thus, the level image P2 can be displayed without hiding the work object in the display image. Therefore, the level image P2 can be prevented from interfering with the operation of the work vehicle 100 by the operator. In addition, the control device 550 according to the first embodiment displays the level image P2 in a region in which the ceiling of the cab 121 is shown, but the present invention is not limited thereto. For example, in another embodiment, when the lower image P15 includes a region in which the floor surface of the cab 121 is shown, the level image P2 may be displayed in the region. On the other hand, in another embodiment, the level image P2 may be disposed at any position of the display device facing the operator. At this time, the level image P2 may be disposed so as to locate the center of the image on the vertical line L, or may be disposed so as to overlap at least part of the image with the vertical line L. Further, for example, the level image P2 may be disposed so as to overlap at least part thereof with a region La in the width direction of the first display device 520 which overlaps with the operator's seat 510 in a plan view from the rear, or a region Lb in the width direction of the first display device 520 which is sandwiched by the operation levers in a plan view from the rear. A position of the vertical line L on the screen does not necessarily pass through the center of the screen.

The level image P2 according to the first embodiment includes the bubble image P22, represents the roll angle of the work vehicle 100 by the position of the bubble image P22 in the width direction of the first display device 520 and represents the pitch angle of the work vehicle 100 by the position of the bubble image P22 in the height direction of the first display device 520.

In addition, in another embodiment, the level image P2 does not have to simulate a bubble level. For example, in another embodiment, the level image P2 may simulate an aircraft attitude indicator or a laser level. For example, instead of the level image P2, another posture image in which an image of the work vehicle 100 displayed at the center of the image is inclined according to the roll angle or the pitch angle may be displayed in an overhead image. That is, the posture image according to another embodiment may display at least one of the roll angle and the pitch angle.

Another Embodiment

Although one embodiment has been described in detail with reference to the drawings hereinbefore, a specific configuration is not limited to the description above, and various design changes are possible.

In the above-described embodiment, the control device 550 generates the level image P2 based on the vehicle information received from the work vehicle 100, but it is not limited thereto. For example, another embodiment may generate the level image P2 by the control device 125 of the work vehicle 100 or an external server device and receive and display it by the control device 550.

INDUSTRIAL APPLICABILITY

The display control system according to the present invention enables the operator to intuitively recognize the inclination of the work vehicle.

The invention claimed is:

1. A display control system of a display device facing an operator's seat of a remote operation device for performing remote operation of a work vehicle, the display control system comprising:
a processor configured to:
acquire a captured image captured by an imaging device mounted on the work vehicle;
communicate with one or more sensors disposed at the work vehicle and receive sensing information including a roll angle and a pitch angle of the work vehicle for the one or more sensors;
generate a posture image representing the roll angle and the pitch angle of the work vehicle;
generate a display image including the posture image on the captured image to thereby display the posture image at a position facing the operator's seat of the display device, the posture image indicating an inclination of the work vehicle based on the roll angle and the pitch angle; and
output a display signal for displaying the display image to the display device,
wherein the processor is further configured to:
divide the captured image into a plurality of cutout images that are spaced apart from one another and include a plurality of parts of the work vehicle, respectively,
generate the display image to include the posture image in one of the plurality of cutout images, and
move a position of the posture image within the one of the plurality of cutout images based on the roll angle and the pitch angle of the work vehicle.

2. The display control system according to claim 1, wherein the processor is configured to generate the display image to thereby display in a region in which the posture image overlaps with the operator's seat when the display device is viewed in a plan view from a rear of the operator's seat or within a region sandwiched between operation levers provided on left and right of the operator's seat when the display device is viewed in a plan view.

3. The display control system according to claim 1, wherein the processor is configured to display the posture image in a region in which the work vehicle is configured to be shown in the captured image.

4. The display control system according to claim 1, wherein the posture image includes an aiming image, and
the roll angle of the work vehicle is represented by a position of the aiming image in a width direction of the display device, and
the pitch angle of the work vehicle is represented by a position of the aiming image in a height direction of the display device.

5. The display control system according to claim 1, wherein the captured image and the posture image share the same alignment in both left and right directions.

6. The display control system according to claim 1, wherein the processor is further configured to generate the posture image including a plurality of images, the plurality of images including (i) a housing image, (ii) a marked-line image that defines a center of the housing image in a coordinate system, and (iii) a moving image configured to move within the housing image relative to the center based on the roll angle and the pitch angle of the work vehicle.

7. The display control system according to claim 6, wherein the moving image comprises a bubble image that has a circular shape.

8. The display control system according to claim 1, wherein the position of the posture image is disposed within an arrangement region in which a ceiling portion of a cab of the work vehicle is shown in the captured image and on a vertical line facing the operator's seat in a width direction when displayed on the display device.

9. A display control method for a display device facing an operator's seat of a remote operation device for performing remote operations of a work vehicle, the display control method comprising:
acquiring a captured image captured by an imaging device mounted on the work vehicle;
acquiring a posture image representing a roll angle and a pitch angle of the work vehicle;
generating a display image in which the posture image is disposed on the captured image so as to display the posture image at a position facing the operator's seat of the display device, the posture image indicating an inclination of the work vehicle based on the roll angle and the pitch angle; and
displaying the display image on the display device,
wherein generating the display image comprises:
dividing the captured image into a plurality of cutout images that are spaced apart from one another and include a plurality of parts of the work vehicle, respectively,
generating the display image to include the posture image in one of the plurality of cutout images, and
moving a position of the posture image within the one of the plurality of cutout images based on the roll angle and the pitch angle of the work vehicle.

10. The display control method according to claim 9, wherein generating the display image comprises generating the display image so as to display in a region in which the posture image overlaps with the operator's seat when the display device is viewed in a plan view from a rear of the operator's seat or within a region sandwiched between operation levers provided on left and right of the operator's seat when the display device is viewed in a plan view.

11. The display control method according to claim 9, wherein generating the display image comprises providing the posture image in a region in which the work vehicle is configured to be shown in the captured image.

12. The display control method according to claim 9, wherein the posture image includes an aiming image, and
  the roll angle of the work vehicle is represented by a position of the aiming image in a width direction of the display device, and
  the pitch angle of the work vehicle is represented by a position of the aiming image in a height direction of the display device.

13. The display control method according to claim 9, wherein the captured image and the posture image share the same alignment in both left and right directions.

14. A remote operation system for performing remote operation of a work vehicle, comprising:
  a display configured to display a captured image captured by an imaging device mounted on the work vehicle and a posture image representing a roll angle and a pitch angle of the work vehicle; and
  an operator's seat configured to face the display,
  wherein the posture image is displayed at a position facing the operator's seat in a width direction of the display and indicates an inclination of the work vehicle based on the roll angle and the pitch angle,
  wherein the captured image is divided into a plurality of cutout images that are spaced apart from one another and include a plurality of parts of the work vehicle, respectively, and
  wherein the display is configured to display a display image including the posture image in one of the plurality of cutout images and to move a position of the posture image within the one of the plurality of cutout images based on the roll angle and the pitch angle of the work vehicle.

15. The remote operation system according to claim 14, wherein the posture image includes an aiming image, and
  the roll angle of the work vehicle is represented by a position of the aiming image in a width direction of the display, and
  the pitch angle of the work vehicle is represented by a position of the aiming image in a height direction of the display.

16. The remote operation system according to claim 14, wherein the captured image and the posture image share the same alignment in both left and right directions.

* * * * *